Sept. 9, 1930.　　　　　G. R. HAUB　　　　　1,775,199
METHOD AND APPARATUS FOR SEVERING MOLTEN GLASS
Filed Aug. 1, 1927　　　2 Sheets-Sheet 1

Inventor
George R. Haub.
By Eccleston & Eccleston
Attorneys

Sept. 9, 1930.　　　　　G. R. HAUB　　　　　1,775,199
METHOD AND APPARATUS FOR SEVERING MOLTEN GLASS
Filed Aug. 1, 1927　　　2 Sheets-Sheet 2
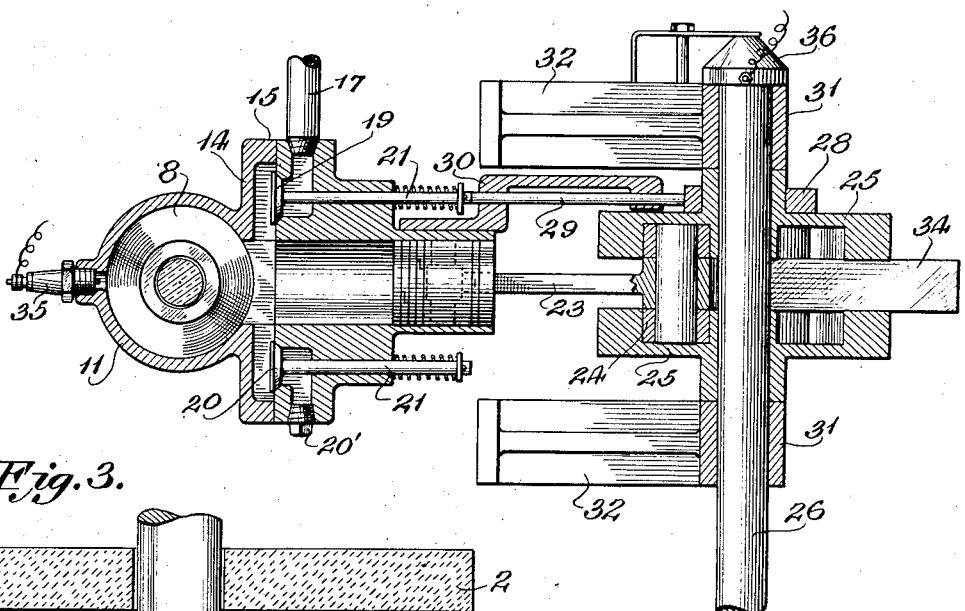
Fig. 3.
Fig. 4.
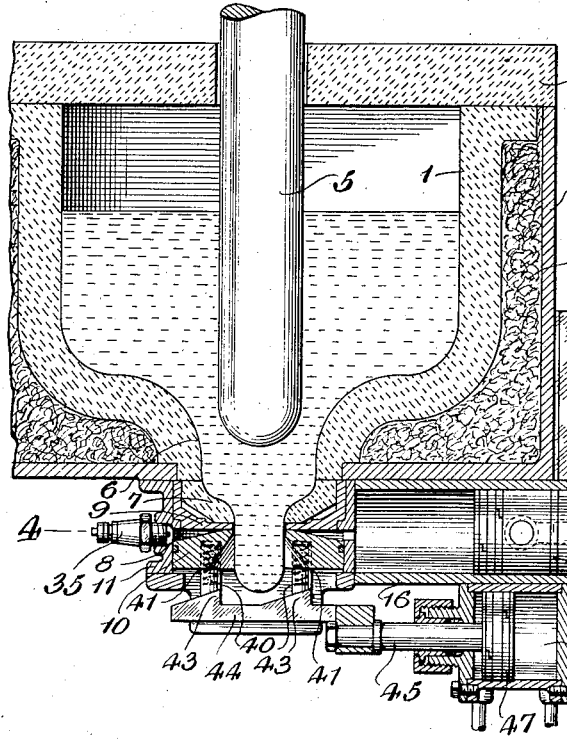
Fig. 5.
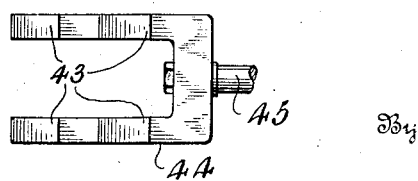
Inventor
George R. Haub.
By Eccleston & Eccleston
Attorneys Patented Sept. 9, 1930

1,775,199

UNITED STATES PATENT OFFICE

GEORGE R. HAUB, OF WASHINGTON, PENNSYLVANIA, ASSIGNOR TO HAZEL-ATLAS GLASS CO., OF WHEELING, WEST VIRGINIA, A CORPORATION OF WEST VIRGINIA

METHOD AND APPARATUS FOR SEVERING MOLTEN GLASS

Application filed August 1, 1927. Serial No. 209,919.

The severing of molten glass by metal shears or other metallic tools, though now in common practice, is very objectionable in that the contact of the metal with the molten glass chills the latter and results in the appearance of scars or "shear marks" in the finished article. Several attempts have been made to eliminate the use of metal instruments in the cutting of molten glass by using in lieu thereof a cutting flame, or a stream of compressed air or gases. These efforts have all proven ineffective however, and mainly for the reason that the temperature and pressure of the fluids experimented with were not sufficiently high to accomplish their purpose.

An object of the present invention therefore resides in the creation of a severing means in the form of a thin, knife-like flame of extremely high temperature and pressure, by the use of an explosive mixture, and in directing this knife-like flame transversely through the column of molten glass protruding through the outlet of the flow spout so as to sever therefrom a charge or gob of molten glass without in any way chilling the glass.

A further object of the invention consists in so directing the gases employed in the severing operation as to aid in shaping the mold charge of molten glass in a manner best suited to the article being formed.

Another object of the invention consists in the formation of an apparatus of simple and inexpensive design for producing and directing the cutting fluid or gases and which may be readily applied to the conventional flow spout.

Other objects and advantages of the invention will appear from the following description taken in connection with the accompanying drawings; in which Figure 1 is a vertical sectional view of the apparatus.

Figure 3 is a vertical sectional view of a modified form of construction.

Figure 4 is a horizontal sectional view of the apparatus of Figure 3, taken on line 4—4; and Figure 5 is a detail plan view of the wedge member for controlling the movements of the bottom wall of the explosion chamber.

Figures 1, 2:
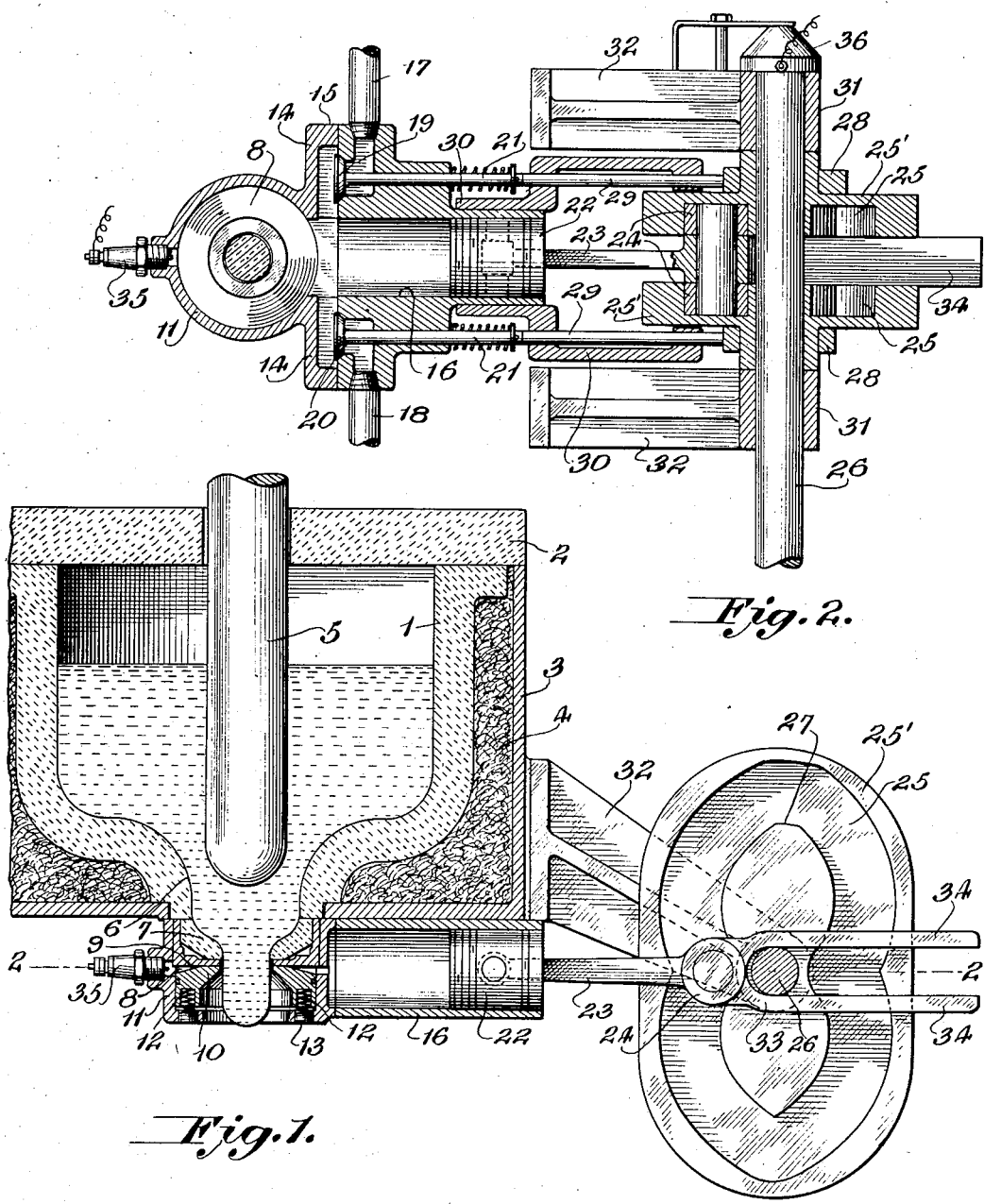
Figure 2 is a horizontal sectional view taken on line 2—2 of Figure 1.

Referring to the drawings in greater detail the numeral 1 indicates generally a conventional flow spout, having a cover 2, an outer metallic casing 3, and heat insulation material 4. Numeral 5 indicates a feed control plug, which is mounted in alignment with the usual flow orifice 6 and bushing 7. The plug 5 may be stationary and adjustable, or it may be reciprocated, or pneumatic control means may be substituted for the usual plug control.

Mounted adjacent the orifice 6 and in alignment therewith is an annular explosion chamber designated generally by the numeral 8 and including a fixed upper wall 9 and a piston-like lower wall 10. The lower wall 10 is of annular shape and is beveled on its upper surface so as to cooperate with wall 9 in forming the annular explosion chamber 8. The wall 10 is reciprocably mounted in the cylindrical wall 11 which is fixedly secured to the bottom of the flow spout and which also surrounds the fixed wall 9. Wall 10 has a gas-tight fit within the cylindrical member 11 and is normally held with its inner edge in contact with the wall 9 by means of a plurality of coil springs 12 which are mounted in recesses in the bottom of the wall 10 and in a flange on the bottom of the cylindrical wall 11. Adjusting screws 13 are provided for varying the compression on springs 12 thereby varying the pressure required in moving the wall 10 from its seat against upper wall 9. The openings in walls 9 and 10 are preferably of slightly greater diameter than the opening in bushing 7 so as to avoid contact of these walls with the molten glass.

The cylindrical wall 11 is provided with tangential extensions 14 which are flanged as indicated at 15 to provide a cylinder head for a cylinder 16. This cylinder is provided with intake and exhaust ports 17 and 18 controlled by the intake and exhaust valves 19 and 20 respectively; the latter being provided with spring-pressed valve stems 21 such as found in the ordinary internal combustion engine. The piston for cylinder 16, which is indicated by numeral 22, is reciprocated by means of piston rod 23 which has one end pivoted to the piston and the other end provided with rollers 24 for cooperation with cam grooves 25 in the cams 25′. These cams are mounted on drive shaft 26, and the contour of the cam grooves is such as to cause two complete reciprocations of the piston 22 for each revolution of shaft 26; and it should be particularly noted that each cam is provided with a flattened portion 27 for a purpose to be later described.

Supplemental cams 28 are fixed to the hubs of cams 25 so as to rotate therewith and serve to move the rods 29 which are in alignment with valve rods 21, to unseat valves 19 and 20. Rods 29 are slidably mounted in the brackets 30 secured to the cylinder 16 and are, of course, returned to normal position by the coil springs on the valve stems.

The drive shaft 26 for operating the piston 22 and valves 19 and 20 is rotatably mounted in bearings 31 carried by brackets 32, the latter being rigidly secured to a side of the flow spout. This shaft serves as a support and guide for the piston rod 23 which is provided with a forked end 33, the tines 34 of which are disposed on opposite sides of the shaft.

As heretofore intimated, gas charges are periodically compressed in the explosion chamber 8 and for the purpose of exploding these charges I provide a conventional spark plug 35 which is secured in place in the cylindrical wall 11 in the usual manner with its terminals positioned in the explosion chamber. The spark plug is placed in an electric circuit which also includes a timer 36 of ordinary construction except that it has only a single contact. This timer is connected with the drive shaft 26 and thus serves to close the circuit through the spark plug once during each rotation of the shaft; the drive shaft, of course, being geared or otherwise connected to the usual forming machine so that the entire mechanism is properly synchronized.

The operation of the conventional internal combustion engine of the four cycle type is of course, well known and it is therefore believed unnecessary to here give a detailed description of the present gas feeding mechanism which is substantially that of the ordinary internal combustion engine. However, it may be well to mention that as the piston 22 is moved to the right (Figure 1) by means of the cams 25′ gas is drawn into the cylinder 16 through the intake valve 19; this valve is then closed and the gas compressed in the annular explosion chamber 8 as the piston is moved to the left. At this point in the cycle of operations the timer 36 will close the circuit through the spark plug 35 and explode the gas charge within the explosion chamber. The exploded gases of course are for severing a charge of glass from the column of glass extending from the flow spout and are not for the purpose of applying power to the piston 22. It is for this reason that the cam 25 is provided with the flattened portion 27; i. e., to prevent movement of the piston away from the explosion chamber at the time the gases are exploded, thereby causing the full force of the explosion to be applied to depressing the wall 10 against the pressure of springs 12 and in cutting through the column of glass. After this operation is performed the springs 12 will return the wall 10 into engagement with the fixed wall 9 of the explosion chamber. At this time also the continued rotation of cams 25 will again move piston 22 to the right (Figure 1) and on the subsequent movement of the piston toward the explosion chamber any exhaust gases which were trapped in the explosion chamber by the upward movement of the wall 10 will be forced out through the exhaust valve 20; it being understood that this valve will be automatically opened by means of its cam 28 on the drive shaft 26. The cycle of operations is then repeated as the intake valve 19 is opened to admit a new charge of explosive gases to the combustion chamber.

From the foregoing it will be apparent that I provide a mechanism by which a charge of highly compressed explosive gas is placed around the glass column and exploded, thereby intermittently creating an intensely hot flame under high pressure which is directed through the glass column in a knife-like stream so as to make a clean cut through the glass without any deleterious effects, such as chilling of the upper surface of the severed gob or of the depending stub of glass which will form the lower end of the succeeding gob.

Obviously the invention contemplates the use of any desired explosive mixture, such as gasolene vapor and air, acetylene and oxygen, etc.

In the modified form of the invention shown in Figures 3, 4 and 5, the exhaust gases are used for controlling the shape of the gobs. Accordingly the exhaust valve 20 may be removed or be rendered ineffective by closing the exhaust port as indicated by numeral 20′ in Figure 4. Also the bracket 30 for supporting and guiding the exhaust valve operating rod 29 may be removed as well as the cam 28 which would otherwise cooperate with that rod.

The wall 10 is supported by wedges 40 which have lower beveled surfaces and which are provided on their upper ends with integral sockets 41 in which are seated the springs 42; the latter having their upper ends positioned in vertically disposed holes formed in the bottom of wall 10. Cooperating with the wedges 40 are wedges 43 which are formed on the wedge member 44, and the movements of the member 44 are controlled by piston rod 45 with which the member 44 is rigidly connected. A conventional type of compressed air cylinder 46 and piston 47 are employed for reciprocating the rod 45 and the extent of movement of rod 45 may be varied by the usual adjusting screws. This cylinder is controlled by the ordinary timing shaft so that movements of the wedge member 44 will be synchronized with the other elements of the mechanism and with the forming machine.

The operation of this modified form of the invention is identical with that previously described except that on the exhaust stroke of the piston 22 any exhaust gases trapped in the cylinder will be forced out through the narrow split between the walls 9 and 10 rather than through the exhaust valve 20. When the charge of gases is exploded the pressure created within the explosion chamber will depress the wall 10 against the pressure of the spring wedges 40 so as to allow the flame under high temperature and pressure to be projected in a thin knife-like sheet through the column of glass. The spring wedges will then immediately raise the wall 10 into sealing contact with wall 9 and trap a portion of the exhaust gases within the explosion chamber 8 and cylinder 16. At any time thereafter, depending upon the preferred adjustment of the mechanism, the piston 47 may be moved to the right, (Figure 3) so as to move the wedge member 44 to the right, thereby permitting the wall 10 to descend sufficiently to allow the trapped gases to escape through the space between the walls 9 and 10. This sheet of exhaust gases will temporarily retard the flow of glass through the orifice and thus serve to influence the shape of the charges. The extent of the influence of the exhaust gases on the charges of glass will, of course, depend in part upon the time of discharge of the gases and in part upon the extent to which the wall 10 is moved downwardly; i. e., upon the size of the annular passage in the explosion chamber.

The invention disclosed herein is obviously subject to many changes and modifications, and the following claims are drawn to the invention broadly, and are intended to cover all such changes and modifications.

What I claim is:

1. In a glass furnace a flow spout having a flow orifice, an explosion chamber adjacent said orifice, and means for compressing an explosive gas in said chamber.

2. In a glass furnace a flow spout having a flow orifice, an explosion chamber disposed adjacent said orifice, said chamber including a movable wall, and resilient means normally holding said wall in closed position.

3. In a glass furnace a flow spout having a flow orifice, an annular explosion chamber disposed adjacent said orifice and including a fixed and movable wall, and resilient means normally holding said movable wall in contact with the fixed wall.

4. In a glass furnace, a flow spout having a flow orifice, an explosion chamber disposed adjacent said orifice, said chamber provided with a normally closed opening facing the axis of said orifice, means for compressing an explosive gas in said chamber, and means for igniting the gas.

5. In a glass furnace a flow spout having a flow orifice, an annular explosion chamber disposed adjacent said orifice and having its axis in substantial alignment with that of the orifice, said chamber provided with a normally closed opening facing the axis of said orifice, means for compressing an explosive gas in said chamber, and means for igniting said gas.

6. In a glass furnace a flow spout having a flow orifice, an explosion chamber disposed adjacent said orifice, said chamber including a movable wall, means normally holding said wall in closed position, and means for compressing an explosive gas in said chamber.

7. In a glass furnace a flow spout having a flow orifice, an explosion chamber disposed adjacent said orifice, said chamber including a movable wall, springs normally holding said wall in closed position, means for compressing an explosive gas in said chamber and means for igniting said gas.

8. In a glass furnace a flow spout having a flow orifice, an annular explosion chamber disposed adjacent said orifice, a movably-mounted piston-like wall forming one side of said chamber, springs normally holding said wall in closed position, and means for compressing an explosive gas in said chamber.

9. In a glass furnace a flow spout having a flow orifice, an explosion chamber disposed adjacent said orifice, and means including a reciprocable piston for compressing a gas in said chamber.

10. In a glass furnace a flow spout having a flow orifice, an explosion chamber disposed adjacent said orifice, and means for feeding and compressing an explosive gas in said chamber, said means including a cylinder and piston.

11. In a glass furnace a flow spout having a flow orifice, an explosion chamber disposed adjacent said orifice, and means for controlling the intake and exhaust of said chamber, said means including a cylinder and piston and intake and exhaust valves associated therewith.

12. In a glass furnace a flow spout having a flow orifice. an explosion chamber disposed adjacent said orifice, means for controlling the intake and exhaust of said chamber, said means including a cylinder and piston and intake and exhaust valves associated therewith, and means for operating said piston and valves.

13. In a glass furnace a flow spout having a flow orifice, an explosion chamber disposed adjacent said orifice, means for controlling the intake and exhaust of said chamber, said means including a cylinder and piston and intake and exhaust valves associated therewith, and a cam shaft provided with a plurality of cams for operating said piston and valves.

14. In a glass furnace a flow spout having a flow orifice, an explosion chamber disposed adjacent said orifice, means for controlling the intake and exhaust of said chamber, said means including a cylinder and piston and intake and exhaust valves associated therewith, a shaft, a plurality of cams thereon for operating said piston and valves, an electric circuit including a spark plug located in said chamber, and a timer in said circuit and controlled from said shaft for opening and closing said circuit.

15. In a glass furnace a flow spout having a flow orifice, an explosion chamber disposed adjacent said orifice, means for controlling the intake and exhaust of said chamber, said means including a cylinder and piston and intake and exhaust valves associated therewith, a shaft adapted to be geared to a forming machine, cams thereon for operating said piston and valves, an electric circuit including means for igniting gases in said chamber, and a timer for opening and closing the circuit.

16. In a glass furnace a flow spout having a flow orifice, an explosion chamber disposed adjacent said orifice, means for feeding an explosive gas to said chamber, means for igniting said gas, said chamber provided with a movable wall adapted to permit the escape of exploded gases, means normally supporting said wall in closed position, and means rendering said wall-supporting means inoperative.

17. In a glass furnace a flow spout having a flow orifice, an explosion chamber disposed adjacent said orifice, means for feeding an explosive gas to said chamber, means for igniting said gas, said chamber provided with a movable wall adapted to permit the escape of exploded gases, springs normally holding said wall in closed position, wedges normally supporting said springs in operative position, and means for withdrawing said wedges.

18. In a glass furnace a flow spout having a flow orifice, an explosion chamber disposed adjacent said orifice, means for intermittently feeding an explosive fluid to said chamber, means for igniting the fluid, a member movable by the pressure generated to release the gases to sever a glass charge, and means operated in the desired time relation to release products of combustion to retard the flow of glass.

19. The method of severing molten glass which includes compressing a charge of explosive gases in an explosion chamber surrounding a glass flow passage, periodically igniting the compressed gases and opening communication between the explosion chamber and the flow passage, and directing the ignited gases through the glass.

20. The method of severing and shaping mold charges of molten glass which includes periodically igniting a charge of explosive gases in an explosion chamber, periodically opening the explosion chamber and directing the ignited gases through the molten glass and employing the exhaust gases to retard the flow of glass and thereby shape the charges.

GEORGE R. HAUB.